(12) United States Patent
Wenger et al.

(10) Patent No.: US 12,048,301 B2
(45) Date of Patent: Jul. 30, 2024

(54) BIRD OR BAT DETECTION AND IDENTIFICATION FOR WIND TURBINE RISK MITIGATION

(71) Applicant: IDENTIFLIGHT INTERNATIONAL, LLC, Louisville, CO (US)

(72) Inventors: Eric S. Wenger, Lakewood, CO (US); Andrew G. Oliver, Longmont, CO (US); Victor L. Babbitt, Superior, CO (US)

(73) Assignee: IDENTIFLIGHT INTERNATIONAL, LLC, Louisville, CO (US)

( * ) Notice: Subject to any disclaimer, the term of this patent is extended or adjusted under 35 U.S.C. 154(b) by 57 days.

(21) Appl. No.: 18/085,227

(22) Filed: Dec. 20, 2022

(65) Prior Publication Data

US 2023/0292738 A1    Sep. 21, 2023

Related U.S. Application Data

(63) Continuation of application No. 17/137,170, filed on Dec. 29, 2020, now Pat. No. 11,555,477, which is a
(Continued)

(51) Int. Cl.
*A01M 29/10* (2011.01)
*A01K 29/00* (2006.01)
(Continued)

(52) U.S. Cl.
CPC .......... *A01M 29/10* (2013.01); *A01K 29/005* (2013.01); *A01M 29/16* (2013.01);
(Continued)

(58) Field of Classification Search
CPC ..... Y02E 10/722; Y02E 10/723; F03D 11/00; F03D 11/0091; F03D 11/0041;
(Continued)

(56) References Cited

U.S. PATENT DOCUMENTS

| 5,657,073 | A | | 8/1997 | Henley | |
|---|---|---|---|---|---|
| 5,774,088 | A | * | 6/1998 | Kreithen | ............ A01M 31/002 342/22 |

(Continued)

FOREIGN PATENT DOCUMENTS

| DE | 94 13 712 U1 | 10/1994 |
|---|---|---|
| DE | 10 2007 004 027 | 7/2008 |

(Continued)

OTHER PUBLICATIONS

U.S. Appl. No. 14/829,403, filed Aug. 18, 2015.
(Continued)

*Primary Examiner* — Yvonne R Abbott-Lewis
(74) *Attorney, Agent, or Firm* — Leydig, Voit & Mayer, Ltd.

(57) ABSTRACT

An automated system for mitigating risk from a wind turbine includes a plurality of optical imaging sensors. A controller receives and analyzes images from the optical imaging sensors to automatically send a signal to curtail operation of the wind turbine to a predetermined risk mitigating level when the controller determines from images received from the optical imaging sensors that an airborne animal is at risk from the wind turbine.

20 Claims, 6 Drawing Sheets

Related U.S. Application Data continuation of application No. 15/787,087, filed on Oct. 18, 2017, now Pat. No. 10,883,473, which is a continuation of application No. 15/384,550, filed on Dec. 20, 2016, now Pat. No. 9,816,486, which is a continuation of application No. 14/829,403, filed on Aug. 18, 2015, now Pat. No. 9,521,830.

(60) Provisional application No. 62/040,081, filed on Aug. 21, 2014.

(51) Int. Cl.
| | |
|---|---|
| *A01M 29/16* | (2011.01) |
| *A01M 31/00* | (2006.01) |
| *E04B 1/72* | (2006.01) |
| *F03D 7/04* | (2006.01) |
| *F03D 17/00* | (2016.01) |
| *F03D 80/00* | (2016.01) |
| *F03D 80/10* | (2016.01) |
| *G06F 18/24* | (2023.01) |
| *G06T 7/20* | (2017.01) |
| *G06V 10/764* | (2022.01) |
| *G06V 20/13* | (2022.01) |
| *G06V 40/10* | (2022.01) |
| *H04N 13/243* | (2018.01) |
| *H04N 13/296* | (2018.01) |
| *H04N 23/698* | (2023.01) |
| *H04N 23/90* | (2023.01) |
| *F03D 9/00* | (2016.01) |
| *F03D 9/25* | (2016.01) |
| *H02S 10/12* | (2014.01) |

(52) U.S. Cl.
CPC .............. *A01M 31/002* (2013.01); *E04B 1/72* (2013.01); *F03D 7/042* (2013.01); *F03D 7/048* (2013.01); *F03D 17/00* (2016.05); *F03D 80/00* (2016.05); *F03D 80/10* (2016.05); *G06F 18/24* (2023.01); *G06T 7/20* (2013.01); *G06V 10/764* (2022.01); *G06V 20/13* (2022.01); *G06V 40/103* (2022.01); *H04N 13/243* (2018.05); *H04N 13/296* (2018.05); *H04N 23/698* (2023.01); *H04N 23/90* (2023.01); *F03D 9/007* (2013.01); *F03D 9/257* (2017.02); *F05B 2270/804* (2013.01); *H02S 10/12* (2014.12); *Y02E 10/72* (2013.01)

(58) Field of Classification Search
CPC .......... F03D 7/042; F03D 17/00; F03D 80/00; F03D 80/10; A01M 31/002; A01M 29/10; A01M 29/16; G01S 13/88; G01S 13/56; G01S 13/93; G01S 7/415; H04N 13/296; H04N 13/243; A01K 29/005; E04B 1/72
See application file for complete search history.

(56) References Cited

U.S. PATENT DOCUMENTS

| | | | |
|---|---|---|---|
| 6,250,255 B1 * | 6/2001 | Lenhardt | A01M 29/16 119/713 |
| 6,323,858 B1 | 11/2001 | Gilbert et al. | |
| 6,411,327 B1 | 6/2002 | Kweon et al. | |
| 6,623,243 B1 * | 9/2003 | Hodos | F03D 1/0675 416/61 |
| 6,809,887 B1 | 10/2004 | Gao et al. | |
| 6,947,059 B2 | 9/2005 | Pierce et al. | |
| 7,315,799 B1 | 1/2008 | Podolsky | |
| 7,429,997 B2 | 9/2008 | Givon | |
| 7,463,280 B2 | 12/2008 | Steuart, III | |
| 7,506,815 B2 * | 3/2009 | Spiegel | A01M 31/002 119/713 |
| 7,643,055 B2 | 1/2010 | Uebbing | |
| 7,684,591 B2 | 3/2010 | Tamura et al. | |
| 7,701,362 B2 * | 4/2010 | Philiben | G08G 5/0078 362/540 |
| 7,773,121 B1 | 8/2010 | Huntsberger et al. | |
| 7,806,604 B2 | 10/2010 | Bazakos et al. | |
| 7,952,608 B2 | 5/2011 | Thompson | |
| 7,971,827 B2 * | 7/2011 | Barrientos | F02C 7/055 244/121 |
| 8,106,936 B2 | 1/2012 | Strzempko et al. | |
| 8,123,476 B2 | 2/2012 | Stommel | |
| 8,253,777 B2 | 8/2012 | Lin | |
| 8,284,258 B1 | 10/2012 | Cetin et al. | |
| 8,379,486 B2 * | 2/2013 | Adler | G01H 17/00 367/136 |
| 8,401,225 B2 | 3/2013 | Newcombe et al. | |
| 8,446,457 B2 | 5/2013 | Theobald | |
| 8,446,509 B2 | 5/2013 | Jones et al. | |
| 8,502,730 B2 * | 8/2013 | Roche | G01S 13/88 342/61 |
| 8,553,113 B2 | 10/2013 | Ansari et al. | |
| 8,598,998 B2 * | 12/2013 | Vassilev | A01M 29/16 340/573.2 |
| 8,742,977 B1 * | 6/2014 | Piesinger | G01S 7/4008 342/159 |
| 8,780,198 B2 | 7/2014 | McClure et al. | |
| 8,810,411 B2 * | 8/2014 | Marka | A01M 29/10 340/573.2 |
| 8,988,230 B2 | 3/2015 | Nohara et al. | |
| 9,001,211 B1 | 4/2015 | Spivey | |
| 9,046,080 B2 * | 6/2015 | Sliwa | F03D 80/00 |
| 9,124,812 B2 | 9/2015 | Yoo et al. | |
| 9,125,394 B2 * | 9/2015 | Kinzie | G10K 5/02 |
| 9,152,019 B2 | 10/2015 | Kintner | |
| 9,402,026 B2 | 7/2016 | St. Clair | |
| 9,413,930 B2 | 8/2016 | Geerds | |
| 9,413,954 B1 | 8/2016 | Theobald | |
| 9,521,830 B2 | 12/2016 | Wenger et al. | |
| 9,583,133 B2 | 2/2017 | Hirata et al. | |
| 9,609,234 B1 | 3/2017 | Checka | |
| 9,775,337 B2 | 10/2017 | Duncan et al. | |
| 9,816,486 B2 | 11/2017 | Wenger et al. | |
| 9,856,856 B2 | 1/2018 | Wenger et al. | |
| 9,891,049 B2 | 2/2018 | Brown | |
| 10,026,284 B2 | 7/2018 | Takiguchi et al. | |
| 10,275,679 B2 | 4/2019 | Jorquera et al. | |
| 10,519,932 B2 | 12/2019 | Wenger et al. | |
| 10,883,473 B2 | 1/2021 | Wenger et al. | |
| 10,920,748 B2 | 2/2021 | Wenger et al. | |
| 11,544,490 B2 | 1/2023 | Jorquera et al. | |
| 11,555,477 B2 | 1/2023 | Wenger et al. | |
| 11,751,560 B2 | 9/2023 | Wenger et al. | |
| 2001/0019357 A1 | 9/2001 | Ito et al. | |
| 2001/0030280 A1 | 10/2001 | Rockinger et al. | |
| 2002/0122113 A1 | 9/2002 | Foote | |
| 2002/0180759 A1 | 12/2002 | Park et al. | |
| 2004/0100443 A1 | 5/2004 | Mandelbaum et al. | |
| 2004/0212677 A1 | 10/2004 | Uebbing | |
| 2004/0247173 A1 | 12/2004 | Nielsen et al. | |
| 2005/0162978 A1 * | 7/2005 | Lima | F03D 80/00 367/139 |
| 2005/0207487 A1 | 9/2005 | Monroe | |
| 2005/0275721 A1 | 12/2005 | Ishii | |
| 2006/0012681 A1 | 1/2006 | Fujii | |
| 2006/0028548 A1 | 2/2006 | Salivar et al. | |
| 2006/0077262 A1 | 4/2006 | Miyamaki et al. | |
| 2006/0125921 A1 | 6/2006 | Foote | |
| 2006/0204035 A1 | 9/2006 | Guo et al. | |
| 2006/0284971 A1 | 12/2006 | Wren et al. | |
| 2007/0109407 A1 | 5/2007 | Thompson | |
| 2007/0206945 A1 | 9/2007 | DeLorme et al. | |
| 2008/0084787 A1 | 4/2008 | Graber | |
| 2008/0260531 A1 | 10/2008 | Stommel | |
| 2008/0298674 A1 | 12/2008 | Baker et al. | |
| 2008/0298692 A1 | 12/2008 | Guo et al. | |

(56) References Cited

U.S. PATENT DOCUMENTS

| | | | |
|---|---|---|---|
| 2008/0298962 A1* | 12/2008 | Sliwa | F03D 80/00 416/223 R |
| 2009/0185900 A1* | 7/2009 | Hirakata | F03D 17/00 416/31 |
| 2010/0141767 A1 | 6/2010 | Mohanty et al. | |
| 2010/0201525 A1 | 8/2010 | Bahat et al. | |
| 2010/0231687 A1 | 9/2010 | Amory et al. | |
| 2010/0245539 A1 | 9/2010 | Lin | |
| 2010/0265331 A1 | 10/2010 | Tanaka | |
| 2011/0043630 A1 | 2/2011 | McClure et al. | |
| 2011/0069148 A1 | 3/2011 | Jones et al. | |
| 2011/0109491 A1 | 5/2011 | Laufer | |
| 2011/0115969 A1 | 5/2011 | Whillock | |
| 2011/0144829 A1 | 6/2011 | Kim et al. | |
| 2011/0164108 A1 | 7/2011 | Bates et al. | |
| 2011/0192212 A1* | 8/2011 | Delprat | F03D 17/00 73/12.01 |
| 2011/0260907 A1* | 10/2011 | Roche | G01S 13/88 342/27 |
| 2012/0003089 A1* | 1/2012 | Byreddy | B08B 3/024 416/61 |
| 2012/0147133 A1 | 6/2012 | Hadwiger et al. | |
| 2012/0154521 A1 | 6/2012 | Townsend et al. | |
| 2012/0242788 A1 | 9/2012 | Chuang et al. | |
| 2012/0242837 A1 | 9/2012 | Sasagawa et al. | |
| 2012/0257064 A1 | 10/2012 | Kim et al. | |
| 2012/0328152 A1 | 12/2012 | Bamba | |
| 2013/0050400 A1* | 2/2013 | Stiesdal | F03D 80/00 348/36 |
| 2013/0052010 A1* | 2/2013 | Nielsen | F03D 80/10 416/1 |
| 2013/0100255 A1 | 4/2013 | Ohba et al. | |
| 2013/0155235 A1 | 6/2013 | Clough et al. | |
| 2013/0188070 A1 | 7/2013 | Lee et al. | |
| 2013/0201296 A1 | 8/2013 | Weiss et al. | |
| 2013/0224018 A1* | 8/2013 | Kinzie | F03D 80/10 416/1 |
| 2013/0249218 A1* | 9/2013 | Vassilev | F03D 80/10 290/55 |
| 2013/0257641 A1 | 10/2013 | Ronning | |
| 2013/0280033 A1 | 10/2013 | Babbitt et al. | |
| 2013/0298845 A1 | 11/2013 | Blanchard | |
| 2014/0029855 A1 | 1/2014 | Manako et al. | |
| 2014/0144390 A1 | 5/2014 | Duncan et al. | |
| 2014/0148978 A1* | 5/2014 | Duncan | A01M 29/18 119/713 |
| 2014/0153916 A1 | 6/2014 | Kintner | |
| 2014/0160274 A1 | 6/2014 | Ishida et al. | |
| 2014/0201126 A1 | 7/2014 | Zadeh et al. | |
| 2014/0241878 A1* | 8/2014 | Herrig | F03D 80/40 416/1 |
| 2014/0261151 A1* | 9/2014 | Ronning | A01M 29/10 116/22 A |
| 2014/0267596 A1 | 9/2014 | Geerds | |
| 2014/0313345 A1* | 10/2014 | Conard | G06V 20/10 348/169 |
| 2014/0341427 A1 | 11/2014 | Kawano | |
| 2014/0362176 A1 | 12/2014 | St. Clair et al. | |
| 2015/0010399 A1 | 1/2015 | Bahat et al. | |
| 2015/0230450 A1* | 8/2015 | Norris | A01M 31/002 367/139 |
| 2015/0341557 A1 | 11/2015 | Chapdelaine-Couture et al. | |
| 2015/0373279 A1 | 12/2015 | Osborne et al. | |
| 2016/0014335 A1 | 1/2016 | Chuang et al. | |
| 2016/0042622 A1 | 2/2016 | Takiguchi et al. | |
| 2016/0053744 A1 | 2/2016 | Wenger et al. | |
| 2016/0055399 A1 | 2/2016 | Hiester | |
| 2016/0063310 A1 | 3/2016 | Okamoto et al. | |
| 2016/0078298 A1 | 3/2016 | Wu et al. | |
| 2016/0198130 A1 | 7/2016 | Chen | |
| 2016/0323504 A1 | 11/2016 | Ono | |
| 2017/0026573 A1 | 1/2017 | Lee | |
| 2017/0161563 A1 | 6/2017 | Cetin et al. | |
| 2017/0163888 A1 | 6/2017 | Norland et al. | |
| 2017/0234966 A1 | 8/2017 | Naguib et al. | |
| 2017/0353658 A1 | 12/2017 | Colin | |
| 2018/0005045 A1 | 1/2018 | Kawano | |
| 2019/0325254 A1 | 10/2019 | Jorquera et al. | |
| 2020/0322585 A1 | 10/2020 | Tsunashima | |
| 2021/0324832 A1 | 10/2021 | Wenger et al. | |
| 2023/0287866 A1 | 9/2023 | Jorquera et al. | |

FOREIGN PATENT DOCUMENTS

| | | |
|---|---|---|
| DE | 20 2010 010765 U1 | 11/2010 |
| DE | 10 2008 018880 A1 | 12/2010 |
| DE | 10 2009 032578 | 1/2011 |
| DE | 10 2012 215451 A1 | 2/2013 |
| EP | 2 190 092 A2 | 5/2010 |
| EP | 1 937 966 B1 | 11/2011 |
| GB | 2470806 | 8/2010 |
| JP | 2003-021046 A1 | 1/2003 |
| JP | 2009-203873 | 9/2009 |
| JP | 2009-229237 | 10/2009 |
| JP | 2010-193768 | 9/2010 |
| WO | WO 01/08478 A1 | 2/2001 |
| WO | WO 2009/102001 A1 | 8/2009 |
| WO | WO 2010/067057 A2 | 6/2010 |
| WO | WO 2012/054313 A1 | 4/2012 |
| WO | WO 2013/114368 A2 | 8/2013 |
| WO | WO 2015/187172 A1 | 12/2015 |
| WO | WO 2016/028922 A1 | 2/2016 |
| WO | WO 2016/028924 A1 | 2/2016 |

OTHER PUBLICATIONS

U.S. Appl. No. 15/384,550, filed Dec. 20, 2016.
U.S. Appl. No. 15/787,087, filed Oct. 18, 2017.
U.S. Appl. No. 17/137,170, filed Dec. 29, 2020.
Arnett et al. (2007) "Impacts of Wind Energy Facilities on Wildlife and Wildlife Habitat," Technical Review 07-2. The Wildlife Society, 54 pp. Accessible on the Internet at URL: http://wildlife.org/wp-content/uploads/2014/05/Wind07-2.pdf. [Last Accessed Mar. 17, 2016].
Collier et al. (2011) "A review of methods to monitor collisions or micro- avoidance of birds with offshore wind turbines," Bureau Waardenburg bv, 38 pages.
DeTect (2014) "Bird & Bat Radar Systems," DeTect, Inc. Accessible on the Internet at URL: http://www.detect-inc.com/avian.html. [Last Accessed Mar. 17, 2016].
DTBird (Aug. 2013) "Presentation: Joining energy to save birds," DTBird, 20 pages.
DTBird (Jan. 2013) "DTBird versus Radar Technology in operating Wind Farms," DTBird.
DTBird (Mar. 2014) "Case Studies: Shutdown on Demand," DTBird, 4 pages.
DTBird Product Brochure (2013) "A Self-Working System to Reduce Bird and Bat Mortality at Wind Farms," DTBird.
Eichhorn et al. (2012) "Model-Based Estimation of Collision Risks of Predatory Birds with Wind Turbines," Ecology and Society 17(2): 12 pages.
European Office Action, dated Jan. 24, 2020, corresponding to European Patent Application No. 15763682.0, 6 pp.
European Office Action, dated Oct. 28, 2019, corresponding to European Patent Application No. 15763682.0, 3 pp.
European Office Action, dated Oct. 9, 2019, corresponding to European Patent Application No. 15763682.0, 6 pp.
Extended European Search Report corresponding to EP Patent Application 15833849.1, dated May 18, 2018, 10 pp.
Extended European Search Report corresponding to EP Patent Application No. 15834027.3, mailed Mar. 27, 2018, 10 pp.
International Search Report for corresponding PCT International Patent Application No. PCT/US2015/045945, mailed Oct. 29, 2015.
International Search Report for corresponding PCT International Patent Application No. PCT/US2015/045949, mailed Oct. 29, 2015.
International Search Report with Written Opinion corresponding to International Patent Application No. PCT/US2015/046327, mailed Nov. 9, 2015, 18 pp.

(56) References Cited

OTHER PUBLICATIONS

Li et al. (Apr. 2014) "Automatic Bird Species Detection From Crowd Sourced Videos," IEEE Transactions on Automation Science and Engineering, IEEE Service Center, New York, NY 11(2): 348-358.
Mahammed et al. (Mar. 2013) "Object Distance Measurement by Stereo Vision," International Journal of Science and Applied Information Technology. 2(2):5-8.
May et al. (Dec. 2012) "Evaluation of the DTBird video-system at the Smola wind-power plant. Detection Capabilities for Capturing Near-Turbine Avian Behavior," Report No. 910. Norwegian Institute for Nature Research, 32 pp.
Official Communication from the European Patent Office (EPO) Examining Division corresponding to EP Patent Application No. 15834027.3, mailed Jan. 17, 2019, 7 pages.
Opposition—Notice, dated Dec. 1, 2020, corresponding to European Patent Application No. 15834027.3, 122 pages.
Opposition—Decision revoking EP Patent No. 3183603 (EP Patent Application No. 15834027.3), dated Nov. 21, 2022, 110 pp.
Supplementary European Search Report, Application No. EP 15834027, dated Apr. 13, 2018, 11 pages.
Alerstam et al. (2007) Flight Speeds among Bird Species: Allometric and Phylogenetic Effects; PLOS Biol 5(8): e197, doi:10.1371/journal.pbio.0050197; pp. 1656-1662; published Aug. 2007.
DTBird System Pilot Installation in the WTG Calandawind, Service Results for the First 2 Months of Operation, Autumn Migration Period 2014; Apr. 2015, 84 pp.
Hayward et al. (1964) "Flight Speeds in Western Bats," Journal of Mammalogy; vol. 45, No. 2; pp. 236-242.
McClure et al. (2018) "Automated monitoring for birds in flight: Proof of concept with eagles at a wind power facility," Biological Conservation 224, pp. 26-33, published May 26, 2018.
McClure et al. (2021) "Eagle fatalities are reduced by automated curtailment of wind turbines," Journal of Applied Ecology, pp. 1-7; https://doi.org/10.1111/1365-2664.13831.
Opposition—Notice, dated Apr. 5, 2022, corresponding to European Patent Application No. 15833849, 40 pp.
Opposition—Summons to attend oral proceedings, dated Dec. 15, 2022, corresponding to European Patent Application No. 15833849, 12 pp.
Opposition—Opponent Withdrawal of Opposition dated Aug. 22, 2023 in European Patent Application No. 15833849.1, 2 pp.
Opposition—Notice of Cancellation dated Sep. 26, 2023 in European Patent Application No. 15833849.1, 1 pp.

* cited by examiner

BIRD OR BAT DETECTION AND IDENTIFICATION FOR WIND TURBINE RISK MITIGATION

CROSS REFERENCE TO RELATED APPLICATIONS

This application is a continuation of U.S. patent application Ser. No. 17/137,170 filed Dec. 29, 2020, which is a continuation of U.S. patent application Ser. No. 15/787,087 filed Oct. 18, 2017 and issued as U.S. Pat. No. 10,883,473, which is a continuation of U.S. patent application Ser. No. 15/384,550 filed Dec. 20, 2016 and issued as U.S. Pat. No. 9,816,486, which is a continuation of U.S. patent application Ser. No. 14/829,403 filed Aug. 18, 2015 and issued as U.S. Pat. No. 9,521,830, which claims the benefit of, and priority to U.S. Provisional Patent Application No. 62/040,081 filed on Aug. 21, 2014, all of which are herein incorporated by reference.

FIELD OF THE INVENTION

This disclosure relates generally to systems and methods for assessing and/or reducing the risk from wind turbines to birds and/or bats.

BACKGROUND

The spinning turbine blades of wind farms pose a risk to birds or bats that fly through the volume swept by the turbine blades. Some government entities may require wind farms to mitigate that risk, particularly for certain bird or bat species protected by law or government regulations. For example, these government entities may require that mitigation of the risk to Golden Eagles or Bald Eagles from a proposed wind farm be demonstrated before installation of the wind farm is permitted. Other governments may not require a permit, but may still issue penalties or fines for those wind farms that harm government identified birds or other animals.

Attempts to mitigate the risk posed by wind farms to protected bird or bat species typically involve curtailing (e.g., slowing or shutting down) operation of wind turbines when it is determined that protected birds or bats may be present. Existing mitigation methods typically cannot specifically identify birds or bats that they detect, and may therefore curtail operation of wind turbines more often than is necessary to mitigate risk to protected bird and bat species. This results in loss of energy and revenue. Further, existing mitigation methods typically have a high capital cost.

SUMMARY

This specification discloses systems and methods that employ optical imaging technology to mitigate the risk posed by wind turbines to airborne animals, and related systems and methods that employ optical imaging to assess such risk prior to or after construction of a wind farm by surveying bird and/or bat populations in the vicinity of the wind farm site.

In one aspect of the invention, an automated system for mitigating risk from a wind turbine to airborne animals of a predetermined species includes a plurality of optical imaging sensors and a controller. The controller receives and analyzes images from the optical imaging sensors to automatically send a signal to curtail operation of the wind turbine to a predetermined risk mitigating level when the controller determines from images from the optical imaging sensors that an airborne animal of the predetermined species is at risk from the wind turbine. In some cases, the control subsequently sends a signal to resume normal operation of the wind turbine when the controller determines from additional images from the optical imaging sensors that there is no longer risk from the wind turbine to the airborne animal of the predetermined species.

The controller may determine whether the airborne animal is a member of a particular predetermined species before the airborne animal is closer to the wind turbine than the distance the particular predetermined species can fly at a characteristic speed of the particular predetermined species in the time required to curtail operation of the wind turbine to the predetermined risk mitigating level. The characteristic speed of the particular predetermined species may be, for example, the average horizontal flight speed of the predetermined species or the maximum horizontal flight speed of the predetermined species. In some examples, the signal may automatically cause at least one of the windmills to initiate the curtailment operations. In other examples, the signal is sent to an operator or technician who makes the judgment call to send a command to at least one of the windmills to execute a curtailment operation.

In some variations the predetermined species include Golden Eagles. In some of these variations the controller determines whether each airborne animal it detects in images from the optical imaging sensors is a Golden Eagle before the detected airborne animal is closer than about 600 meters to the wind turbine. The controller may detect at a distance greater than about 800 meters each airborne animal that it subsequently determines is a Golden Eagle.

In some variations the predetermined species include Bald Eagles. In some of these variations the controller determines whether the airborne animal is a Bald Eagle before the detected airborne animal is closer than about 600 meters to the wind turbine. The controller may detect at a distance greater than about 800 meters each airborne animal that it subsequently determines is a Bald Eagle.

The plurality of optical imaging sensors may be arranged with a combined field of view of about 360 degrees around the wind turbine. The optical imaging sensors may be arranged with overlapping fields of view. In some variations, at least some of the optical imaging sensors are attached to a tower supporting the wind turbine. In some variations one or more of the optical imaging sensors is arranged with a field of view directly above the wind turbine.

The system may include a deterrent system that deploys deterrents, such as flashing lights or sounds for example, to deter the airborne animals from approaching the wind turbine. In such variations, the controller may automatically send a signal to the deterrent system to deploy the deterrent if the controller determines that the airborne animal of the predetermined species is approaching the wind turbine.

In another aspect, an automated system for mitigating risk from a wind turbine to birds or bats of one or more predetermined species include a plurality of optical imaging sensors and a controller. The controller automatically receives and analyzes images from the optical imaging sensors and to automatically send a signal to the deterrent system to deploy a bird or bat deterrent if the controller determines from images from the optical imaging sensors that a bird or bat of the one or more predetermined species is approaching the wind turbine.

The controller may determine whether each bird or bat it detects in images from the optical imaging sensors is a member of a particular predetermined species before the detected bird or bat is closer to the wind turbine than the distance the particular predetermined species can fly at a characteristic speed of the particular predetermined species in the time required to curtail operation of the wind turbine to a predetermined risk mitigating level. The characteristic speed of the particular predetermined species may be, for example, the average horizontal flight speed of the predetermined species or the maximum horizontal flight speed of the predetermined species.

In some variations the predetermined species include Golden Eagles. In some of these variations, the controller determines whether each bird or bat it detects in images from the optical imaging sensors is a Golden Eagle before the detected bird or bat is closer than about 600 meters to the wind turbine. The controller may detect at a distance greater than about 800 meters each bird or bat that it subsequently determines is a Golden Eagle.

In some variations the predetermined species include Bald Eagles. In some of these variations the controller determines whether each bird or bat it detects in images from the optical imaging sensors is a Bald Eagle before the detected bird or bat is closer than about 600 meters to the wind turbine. The controller may detect at a distance greater than about 800 meters each bird or bat that it subsequently determines is a Bald Eagle.

The plurality of optical imaging sensors may be arranged with a combined field of view of about 360 degrees around the wind turbine. The optical imaging sensors may be arranged with overlapping fields of view. In some variations, at least some of the optical imaging sensors are attached to a tower supporting the wind turbine. In some variations one or more of the optical imaging sensors is arranged with a field of view directly above the wind turbine.

In another aspect, an automated system for surveying the population of airborne animals of one or more particular species of interest includes a plurality of optical imaging sensors and a controller. The controller automatically receives and analyzes images from the optical imaging sensors and to automatically determine whether the airborne animals detected in images from the optical imaging sensors are members of the one or more particular species of interest. The particular species of interest may include, for example, Bald Eagles and/or Golden Eagles.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention.

For the purposes of this disclosure, the term "airborne animal" generally refers to animals that employ aerial locomotion. This aerial locomotion may be powered or unpowered. These airborne animals may include flying and gliding animals such as birds, bats, insects, other types of mammals, other types of birds, or combinations thereof.

Figure 1:
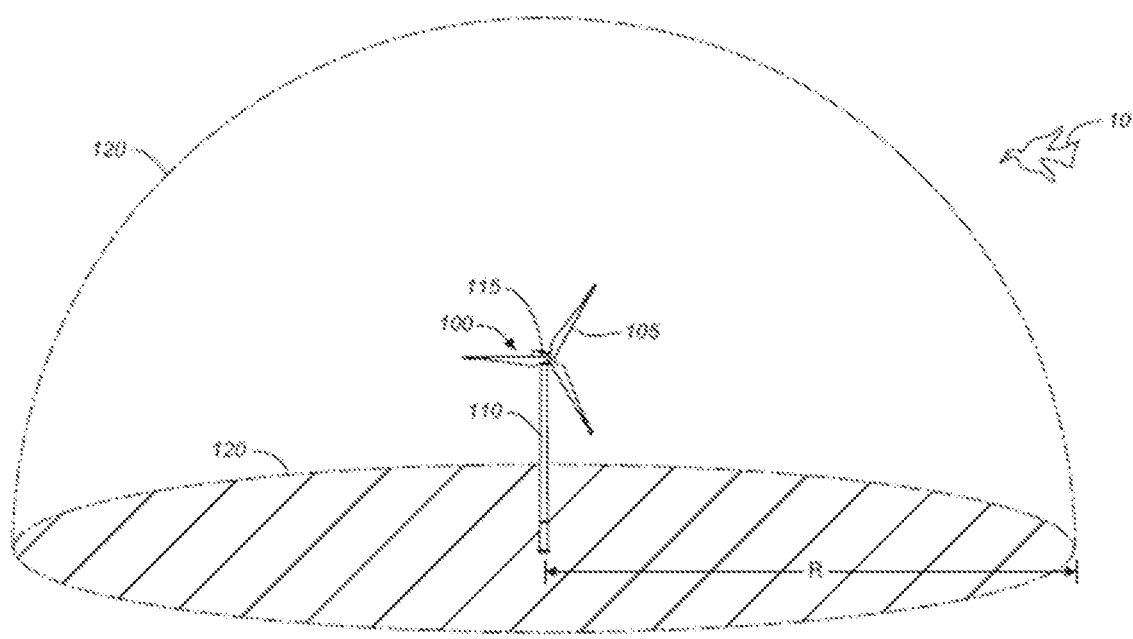
FIG. 1 is a side perspective view of an example wind turbine illustrating a volume of space around the wind turbine defined by example bird or bat risk mitigation methods and systems disclosed herein.
Figure 2:
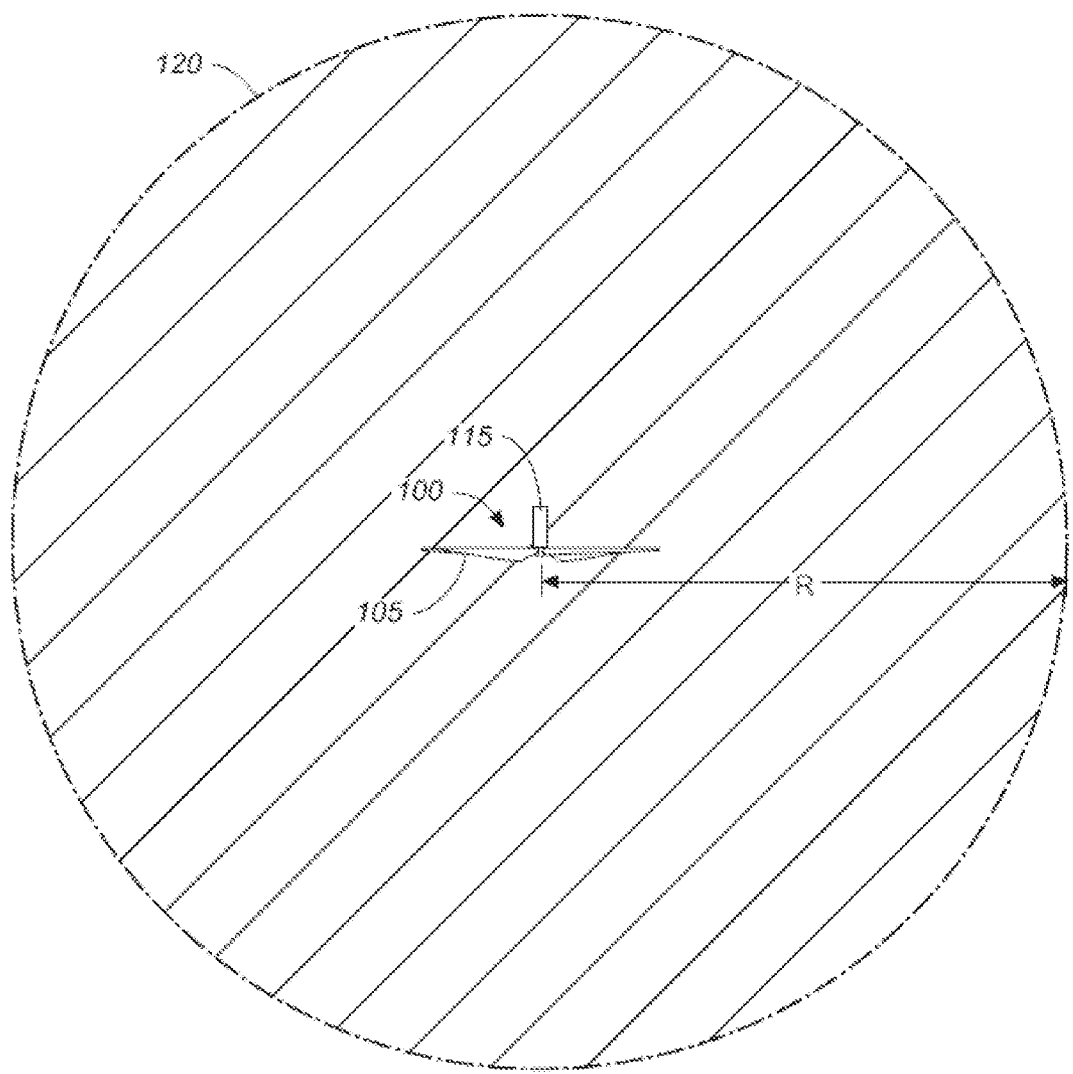
FIG. 2 is a top perspective view of an example of a wind turbine and bird or bat risk mitigation volume illustrated in FIG. 1.

Referring to FIG. 1 (side view) and FIG. 2 (top view), this specification discloses automated systems and methods that employ optical imaging technology to detect airborne animals, such as birds or bats (e.g., bird 10) in flight near a wind turbine 100, determine whether or not the detected bird or bat is of one or more particular protected species requiring risk mitigation (e.g., a Golden Eagle or a Bald Eagle), and based on that determination decide whether or not to curtail operation of the wind turbine 100 and/or whether or not to employ deterrent measures to deter the detected bird or bat from approaching the wind turbine 100. The systems and methods may, for example, positively identify a detected bird or bat to be a member of a protected species for which risk is to be mitigated, positively identify a detected bird or bat to be a member of a species for which risk need not be mitigated, or determine that a detected bird or bat is not a member of a protected species for which risk is to be mitigated without identifying the species of the bird or bat. In some cases, a protected species is defined by a government in which jurisdiction the wind farm is located. But, in other examples, the system may include a list of species that it classifies as a "protected species." In other examples, the species that are considered to be a protected species may be based on international treaties, non-governmental organizations, protection groups, industry experts, scientific studies, religious groups, other individuals, other organizations, or combinations thereof.

In these systems and methods the birds or bats may be first imaged at a distance from the wind turbine 100 greater than or equal to a distance R, and the decisions to curtail or not to curtail operation of the wind turbine 100 and to deploy or not to deploy deterrent measures may be made before the bird or bat approaches closer than distance R to the wind turbine 100. The distance R is selected to provide sufficient time for operation of the wind turbine 100 to be curtailed before the detected bird or bat is likely to reach the volume swept by the wind turbine blades 105, if the bird or bat is flying toward the wind turbine 100 at a speed characteristic of a protected species for which risk is to be mitigated. A characteristic speed of a bird or bat species may be, for example, an average horizontal flight speed or a maximum horizontal flight speed.

Hence the distance R may be selected, for example, to be greater than or equal to the distance that a bird or bat of the protected species for which risk is to be mitigated can fly at that species' known average horizontal flight speed in the time interval required to curtail operation of the wind turbine 100. Alternatively, the distance R may be selected for example to be greater than or equal to the distance that a bird or bat of the protected species for which risk is to be mitigated can fly at that species' known maximum horizontal flight speed in the time interval required to curtail operation of the wind turbine.

If the methods and systems are used to mitigate risk from the wind turbine 100 for more than one protected species of bird and/or bat, R may be determined for example using a characteristic speed of the fastest of the protected species for which risk is to be mitigated. Alternatively, a separate distance R may be determined for each protected species for which risk is to be mitigated.

The distance R may be measured for example from near the base of the wind turbine tower 110 as shown in FIG. 1, from the wind turbine nacelle 115, or from any other suitable location on the wind turbine or its support structure. R may conveniently be measured from at or near the location of one or more optical imaging sensors (further described below) employed in the systems and methods, but this is not required. In the illustrated example, R defines the boundary of a substantially hemispherical mitigation volume 120 around the wind turbine 100.

Wind turbines with which the systems and methods of this disclosure may be employed may have tower heights of, for example, about 60 meters to about 120 meters and blade lengths of, for example, about 40 meters to about 65 meters. Rotation of the blades 105 of such wind turbines 100 may typically be reduced from a normal operating speed of, for example, about 6 to about 20 revolutions per minute (rpm) 0 about 1 rpm or less (e.g., to 0 rpm) in a time period (curtailment time) of, for example, less than about 20 seconds, or less than about 30 seconds. A rotation speed of about 1 rpm or less for such wind turbines 100 may typically be deemed by regulatory authorities to pose an acceptable risk to government-protected bird and bat species. Full curtailment to 0 rpm may be preferable and obtainable in these time intervals. While the above examples have been described with a specific type of windmill tower, any appropriate type of windmill tower may be used in accordance with the principles described in the present disclosure. For example, the tower height may exceed 120 meters and/or the blade length may exceed 65 meters. Further, the normal operating speed of the wind turbines and the curtailment speeds may be outside of the parameters described above. Also, the windmill's turbines may operate at the curtailment speeds for any appropriate amount of time.

As examples, Golden Eagles have an average horizontal flight speed of about 13.5 meters/second and Bald Eagles have an average horizontal flight speed of about 18.0 meters/second. Using these speeds, a value of R equal to about 800 meters would provide about 44 seconds in which to curtail the wind turbine 100 for a Bald Eagle and about 59 seconds in which to curtail the wind turbine 100 for a Golden Eagle. A value of R equal to about 600 meters would provide about 33 seconds in which to curtail the wind turbine 100 for a Bald Eagle, and about 44 seconds in which to curtail the wind turbine 100 for a Golden Eagle. These values for R thus likely provide sufficient time in which to curtail operation of a wind turbine 100 to about 1 rpm or less (e.g., to about 0 rpm), and hence are likely suitable for mitigating risk to Golden Eagles and Bald Eagles using the systems and methods of the present disclosure.

Figure 7:
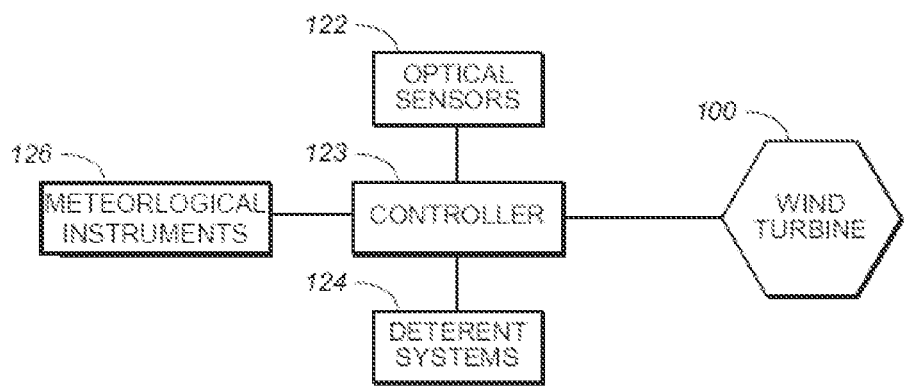
FIG. 7 shows an example block diagram of a system for mitigating risk from a wind turbine to birds or bats.

Referring now to the schematic block diagram of FIG. 7, the bird and bat risk mitigation systems of the present disclosure may include one or more optical sensors (e.g., digital cameras) 122 located on or near a wind turbine 100, one or more bird and/or bat deterrent systems 124, one or more meteorological instruments 126, and one or more controllers 123 in communication with the wind turbine 100, the optical sensors 122, meteorological instruments 126, and the deterrent systems 124. The optical sensors 122 image birds and/or bats in flight near the wind turbine 100 and provide the images to the controller 123. The controller 123 may implement an algorithm that determines whether or not an imaged bird or bat is of one or more particular protected species requiring risk mitigation and whether or not the imaged bird or bat is approaching the wind turbine 100. If the controller 123 determines that an imaged bird or bat is of a protected species for which risk is to be mitigated, and determines that the imaged bird or bat is approaching the wind turbine 100 or is likely to approach dangerously close to the wind turbine 100, the controller 123 signals the wind turbine 100 to curtail operation, or signals the deterrent system 124 to deploy deterrent measures to deter the bird or bat from further approaching the wind turbine 100, or signals the wind turbine 100 to begin curtailing its operation and signals the deterrent system 124 to deploy deterrent measures.

For example, the controller 123 may determine that an imaged bird or bat is of one or more protected species requiring risk mitigation and is approaching the wind turbine 100. While the bird or bat is still at a distance greater than R (defined above), the controller 123 may signal a deterrent system 124 to deploy a deterrent measure in an attempt to deter the bird or bat from further approaching the wind turbine 100. If the controller 123 determines from further images from the optical sensors 122 that the bird or bat was successfully deterred from further approaching the wind turbine 100, the controller 123 may then determine that it is not necessary to curtail operation of the wind turbine 100. If the controller 123 determines instead that the deterrents were not successful and that the bird or the bat continues to approach the wind turbine 100, the controller 123 may signal the wind turbine 100 or a wind farm operator to curtail operation. The controller 123 may, for example, in addition control the deterrent system 124 to continue to deploy deterrent measures while the bird or bat is within a distance R of the wind turbine 100. If operation of the wind turbine 100 is curtailed, after the controller 123 determines from further images from the optical sensors 122 that the bird or bat has left the proximity of the wind turbine 100 and is no longer at risk, the controller 123 may signal the wind turbine 100 to resume normal operation and signal the deterrent system 124 to cease deploying deterrent measures. In some examples, the signals may be sent directly to a windmill to initiate either the deterrent operations or the curtailment operations. In other examples, the signals may be sent to an operator of the windmills where the signals provide information that can be used by the operator to decide whether to send commands to the windmill to initiate the deterrent system or the curtailment system. In these examples, these signals may include details about whether a criterion for determent or curtailment has been met. For example, the signal may include a message explaining a bird is within 600 meters of a particular turbine. In that situation, the operator may study the behavior of the bird through the cameras in the windfarm and decide whether to initiate the curtailment or determent operations. In other examples, the signal may include a message that includes a recommendation with the details about the criterion. In this situations, the operator can still decide whether to send commands to the turbine to execute the determent and/or curtailment operations. In one such example, the message may explain that a bird is within 600 meters of the turbine and is kiting-soaring with tis head down in hunting mode, which meets the curtailment prescription. In another example, the signal may include a message that explains that a bird is within 600 meters of the turbine and is unidirectional flapping-gliding with its head up, which is interpreted to be in safer status and curtailment prescriptions are not met. In each of these situations, the operator may make the decision to take further action. But, in other examples, the signals may be sent directly to the windmills of interest without a human making a decision.

The system just described may employ deterrent measures and may curtail operation of a wind turbine to mitigate risk to a bird or bat of a predetermined protected species. Other variations of such systems may be configured only to employ deterrent measures as described above and not to curtail operation of the wind turbine. Yet other variations of such systems may be configured to curtail operation of a wind turbine as described above, but not to employ deterrent measures.

Optical sensors 122 employed in these systems may include, for example, one or more wide angle field of view (WFOV) cameras mounted with fixed fields of view for object detection and two or more high resolution cameras mounted to pan and tilt to be capable of tracking and identifying a bird or bat as it approaches or passes near the wind turbine 100. The WFOV cameras may be arranged so that their combined fields of view provide 360 degrees of coverage in many directions around the wind turbine 100. Thus, the combined fields may include a spherical vision around the windfarm. The cameras may have the ability to move to tilt upward, tilt downward, rotate, or otherwise move. One or more additional WFOV cameras may be arranged with their fields of view pointed upward to provide, in combination with the other WFOV cameras, substantially hemispherical coverage as depicted in FIG. 1 in the mitigation volume (e.g. 120). The tracking cameras may be arranged to enable tracking and identification of birds or bats in the combined field of view of the WFOV cameras.

The WFOV cameras may be configured to image birds or bats for which risk is to be mitigated at a distance greater than R (defined above), for example at a distance between about 600 meters and about 1000 meters, to provide at least a low resolution blob-like image of the bird or bat. The WFOV cameras may additionally recognize other flying objects and have the capability of initially determining if the flying object is an animal or a non-living object.

The panning high resolution cameras are typically configured to image the detected birds or bats at a distance greater than R (e.g., between about 600 meters and about 1000 meters) with sufficiently high resolution to provide information on size, shape, color, flight characteristics, and/or other features by which it may be determined whether or not the imaged bird or bat is a member of a protected species for which risk is to be mitigated. The panning high resolution cameras may be arranged (e.g., in pairs) with overlapping fields of view to provide stereoscopic imaging of the birds or bats from which the distance to the bird or bat and its speed and direction of motion (velocity) may be determined. While these examples have been described with specific detection distances, any appropriate detection distances may be used in accordance with the principles described in this disclosure. For example, the WFOV optional imaging sensors, the high resolution cameras, or the low resolution cameras may be able to capture images of the airborne objects at distances greater than a 1000 meters. In some examples, the high resolution camera can capture images of airborne objects in distances between 1000 and 10000 meters.

Any suitable cameras or other optical imaging sensors 122 may be employed for the WFOV optical imaging sensors and the panning optical imaging sensors. In some cases, the optical imaging sensors may generate images from visible light, but the optical imaging sensors may additionally and/or alternatively be configured to image birds or bats at infrared wavelengths to provide images at night.

In some variations, an optical sensor 122 includes one or more WFOV cameras arranged to provide general object or blob-like visual detection and two or more high resolution cameras arranged to provide stereoscopic imaging from overlapping fields of view to track birds or bats flying in the field of view of the WFOV cameras. Two or more such modules may be deployed on or around a wind turbine to provide the 360 degree coverage described above.

The meteorological instrumentation 126 may measure climate conditions to predict and/or identify the bird or bat or the behavior of the creature. The meteorological instruments 126 may include at least one of a barometer, ceilometer, humidity detector, rain and precipitation sensor, visibility sensor, wind sensor, temperature sensor, and the like. Specific environmental and climate conditions may determine animal behavior. For example, wind speed and temperature conditions may affect bat feeding behavior. The meteorological instrumentation 126 may also collect seasonal information.

Any suitable controller 123 may be used to control bird and/or bat risk mitigation for the wind turbine. The controller 123 may include, for example, a processor and associated memory and input/output ports or wireless receivers and transmitters that communicate with the wind turbine 100, the optical sensors 122, the meteorological instruments 126, and the deterrent system 124. The controller 123 may be implemented with a programmable computer. The system may include a separate controller for each wind turbine. Alternatively, a single controller 123 may control risk mitigation for two or more wind turbines. A controller 123 may be located on a wind turbine or anywhere else suitable. A controller 123 may communicate with its associated optical sensors 122 and wind turbine 100 (or wind turbines) wirelessly, or through optical or electrical cable for example. The controller 123 may additionally tap into a fiber system associated with the wind tower 110 and wind farm.

The controller 123 may implement an algorithm in which it receives from the WFOV camera or cameras images in which it detects a bird or bat at a distance greater than R from a wind turbine 100. The controller 123 then controls the one or more high-resolution tracking (e.g., pan/tilt) cameras to track the bird or bat and collect and analyze high resolution images from which the controller 123 determines the distance to the bird or bat, its speed and direction of travel, and its height above ground level. The controller 123 may also determine from the high resolution images whether or not the bird or bat is of a protected species for which risk is to be mitigated (e.g., whether or not it is a Golden Eagle or a Bald Eagle). The controller 123 may make the determination based on color, shape, size (e.g., wing span), flight characteristics (e.g., speed, wing motion and/or wing beat frequency), and/or any other suitable features of the bird or bat. If the bird or bat is a member of a protected species for which risk is to be mitigated and is approaching dangerously close to the wind turbine 100 or likely to approach dangerously close to the wind turbine 100, the controller 123 signals the wind turbine 100 to curtail operation and/or signals a deterrent system 124 to deploy a deterrent measure as described above. If operation of the wind turbine 100 is curtailed, after curtailing the wind turbine 100, the controller 123 may continue to track the bird or bat with one or more tracking high-resolution cameras through the optical sensors 122 and collect and analyze images of the bird or bat from the one or more WFOV cameras and the one or more tracking high-resolution cameras until the bird or bat is no longer at risk from the wind turbine 100. For example, until the bird or bat is sufficiently far from the wind turbine 100 (e.g., >R) and moving away from the wind turbine 100. When the bird or bat is no longer at risk, the controller 123 signals the wind turbine 100 to resume normal operation.

The controller 123 may additionally receive information from the meteorological instruments 126 to help determine the behavior of the bird or bat. The types of weather conditions collected by the meteorological instrumentation 126 may provide additional information to the controller 123 to determine if the bird or bat undertakes avoidance measures. Wind speed and temperature conditions may be particular to bat feeding behavior. Seasonal information may be indicative of migratory behavior. Other factors may also be indicative of migratory behavior such as the nature of the airborne object's flight, flight patterns, other factors, or combinations thereof.

The controller 123 may use the additional information to make inferences on the behavior of the bird or bat. For example, a hunting bird or bat may be at higher risk for collision with a wind tower 110. The hunting behavior may cause the creature to not notice the wind tower 110 and may create an increased risk. The controller 123 may initiate curtailment and deterrent system 124 sooner if a hunting behavior is detected. Alternatively, if the controller 123 determines the bird or bat is in a migratory or travel pattern, the controller 123 may delay curtailment and deterrence. The migratory and/or traveling creature may be more likely to notice the wind tower 110 and naturally avoid the structure. The behaviors of the bird may be classified to assist in determining whether the birds are demonstrating hunting behavior, migratory behavior, other types of behavior, or combinations thereof. Examples of behavior categories may include perching, soaring, flapping, flushed, circle soaring, hovering, diving, gliding, unidirectional flapping-gliding, kiting-hovering, stooping or diving at prey, stooping or diving in an agonistic context with other eagles or other bird species, undulating/territorial flight, another type of behavior, or combinations thereof. Behavior and activity prevalent during predetermined intervals (e.g. one minute intervals) can recorded as part of an information gathering protocol. As the bird's behavior is followed over a predetermined amount of time, the bird's behavior type can be predicted.

Deterrent system 124 may deploy bird and/or bat deterrents. In some examples, the deterrents include flashing lights and/or sounds.

In one variation of the systems and methods just described, the WFOV cameras may detect and image birds that may be Golden Eagles or Bald Eagles at a distance of about 1000 meters or more from the wind turbine 100. After or upon detection of the bird with the WFOV cameras, one or more tracking high resolution cameras may begin tracking the bird at a distance of about 800 meters or more from the wind turbine 100. Based on the images from the WFOV and tracking cameras, the controller 123 determines whether or not to curtail operation of the wind turbine 100 and/or whether or not to deploy deterrent measures, and accordingly signals the wind turbine 100 and/or the deterrent system 124 before the bird is closer than about 600 meters to the wind turbine 100.

With the systems and methods of the present disclosure, wind turbines in a wind farm may be individually curtailed and then returned to normal operation as a protected bird or bat for which risk is to be mitigated passes into and out of the individual wind turbine mitigation volumes. For example, the wind farm 128 depicted in FIG. 3 includes wind turbines 100a-100e, each having a corresponding mitigation volume 120a-120e. As bird 10 (for this example, a Golden Eagle) flies through the wind farm, the bird 10 may initially approach wind turbine 100b. Before the bird 10 enters mitigation volume 120b, the bird 10 is identified as a Golden Eagle and wind turbine 100b is instructed to curtail operation. As or after the Golden Eagle exits volume 120b toward wind turbine 100d, wind turbine 100b is instructed to resume normal operation. Operation of wind turbine 100d is then similarly curtailed, and then restored to normal after the risk to the Golden Eagle has passed. Operation of wind turbines 100a, 100c, and 100e are not affected by passage of the Golden Eagle.

The systems mounted on the wind tower 110 may require a source of electricity to function. For example, the deterrent system 124, controller 123, optical sensors 122, and meteorological instruments 126 may all be mounted on the wind tower 110. The systems may require electricity to properly function. The electricity may be supplied in a multitude of ways. The systems may tap into the wind tower 110 itself and draw electricity that is generated by the wind tower 110. The systems may be hardwired into an electrical grid which may provide a continuous power source. The systems may additionally be solar powered. The wind tower 110 may be equipped with solar panels which may fuel the systems or the solar panels may be mounted in a nearby location and may be wired to the systems to provide power. Additionally and/or alternatively, the systems may be battery-powered. For example, the systems may run on an independent power system such as a fuel cell or similar battery function. In another embodiment, the systems may draw a primary source of electricity from one of the sources mentioned herein and may draw back-up electricity from a battery. The battery may be supplied by solar panels, the wind tower, and the like and may store excess energy for the systems to use when a main source of power is inadequate or non-functioning. The battery may be located directly on the wind tower 110 or may be located at a nearby location and wired to the systems as appropriate. In yet other examples, the system may be powered by a small wind generator, the grid, a fuel cell generator, another type of generator, batteries, another type of power source, or combinations thereof.

Figure 3:
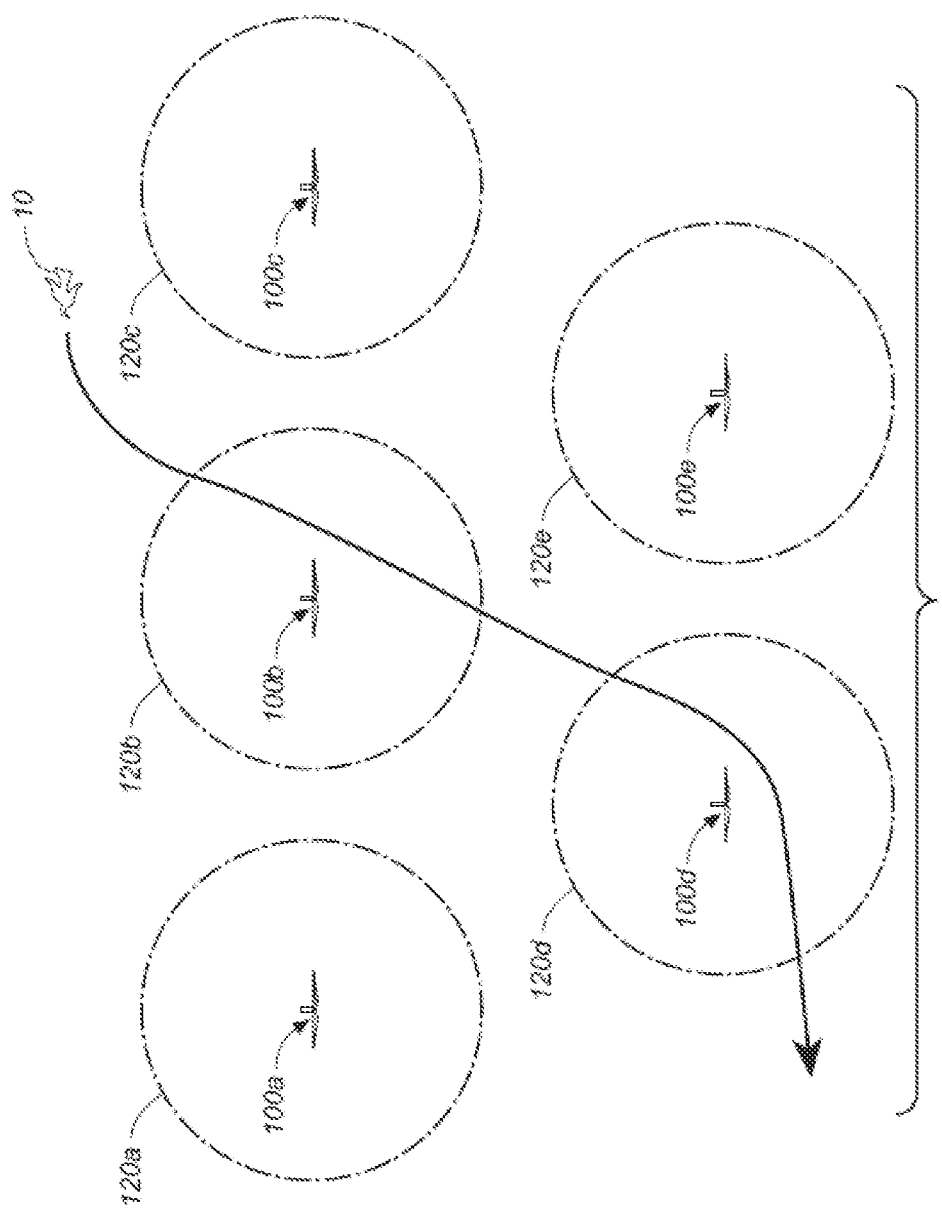
FIG. 3 is a top perspective view of an example of a wind farm illustrating risk mitigation volumes defined by example bird or bat risk mitigation methods and systems disclosed herein, as well as the trajectory of a bird flying through the wind farm and triggering curtailment for some wind turbines but not others.

Although in the example of FIG. 3 the diameters of the mitigation volumes are shown as less than the spacing between wind turbines this need not be the case. The mitigation volumes of different wind turbines in a wind farm may overlap.

Figure 4:
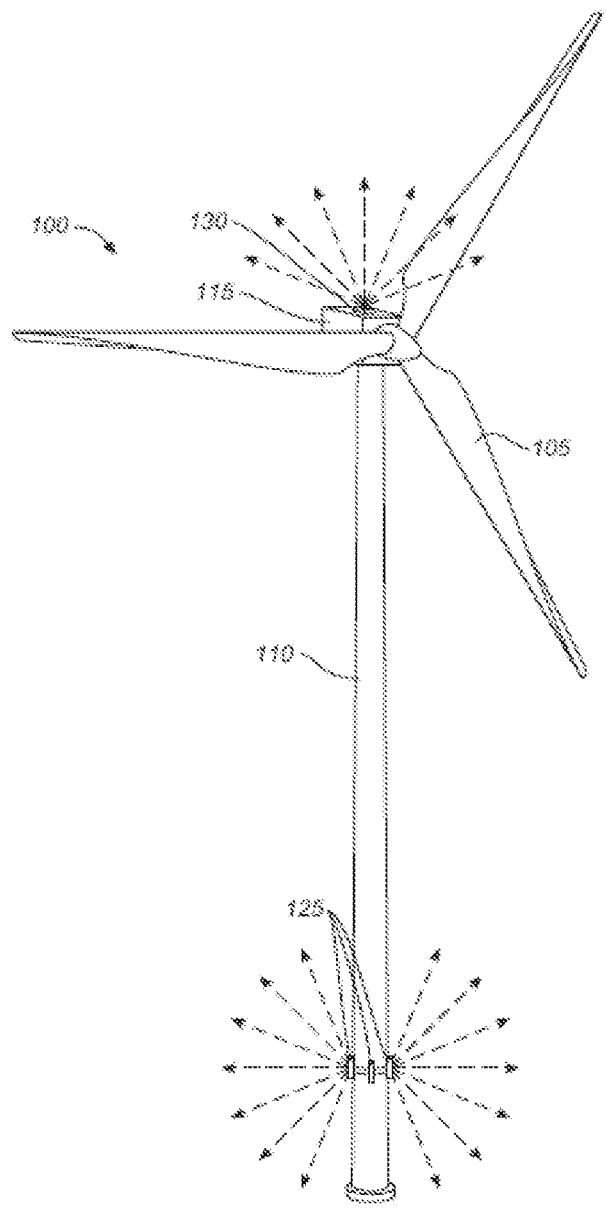
FIG. 4 shows a view of an example of a wind turbine to which optical imaging sensor modules are mounted according to example bird or bat risk mitigation methods and systems disclosed herein.
Figure 5:
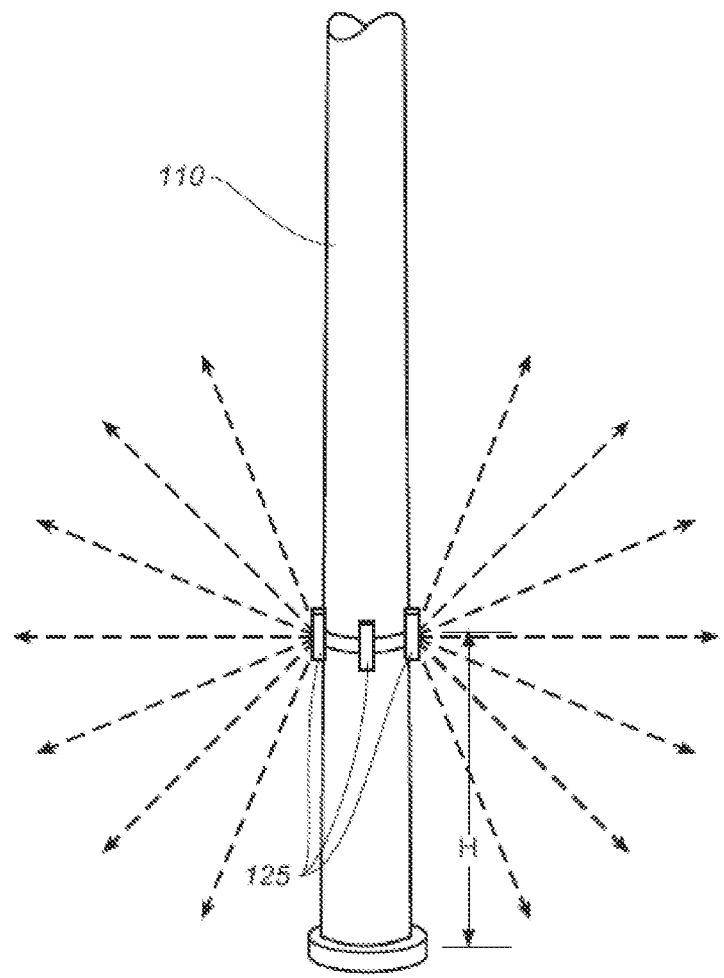
FIG. 5 shows a view of an example of a wind turbine to which optical imaging sensor modules are mounted according to example bird or bat risk mitigation methods and systems disclosed herein.

Referring now to FIG. 4 and FIG. 5, some variations of the methods and systems just described employ two or more optical imaging sensor modules 125 attached to a wind turbine tower 110 at a height H above ground level. Height H may be, for example, about 5 meters to about 30 meters. In some examples, the height H is about 10 meters. The optical imaging sensor modules 125 are arranged around the wind turbine tower 110 to provide a 360 degree field of view as measured in a horizontal plane perpendicular to the tower 110. The field of view may also include a vertical component so that the airborne objects located higher or lower than the cameras are also detected by the camera. In these examples, the cameras may be located at different heights or have an ability to tilt upwards or downwards. (The arrows shown emanating from the optical imaging sensor modules 125 schematically indicate a portion of their fields of view parallel to the tower 110). The illustrated example employs four such optical imaging sensor modules 125 arranged around the tower 110 with a spacing of about 90 degrees between modules. Any other suitable number and spacing of such optical sensor modules 125 may also be used.

Each optical imaging sensor module 125 may include one WFOV camera and two tracking high resolution cameras arranged with overlapping fields of view to provide stereoscopic imaging and to track birds or bats flying in the field of view of the WFOV camera.

Figure 6:
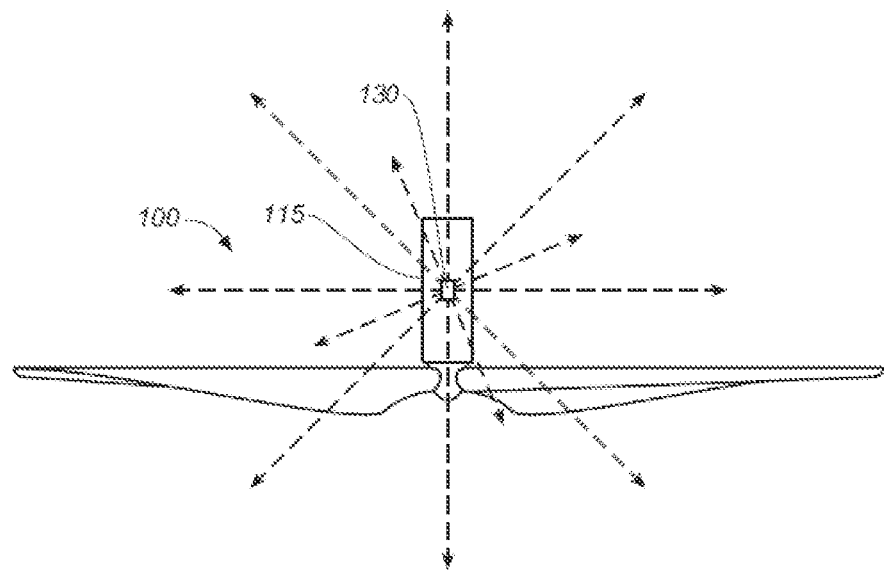
FIG. 6 shows a view of an example of a wind turbine to which optical imaging sensor modules are mounted according to example bird or bat risk mitigation methods and systems disclosed herein.

As shown in FIG. 4 and FIG. 6, an additional optical imaging sensor module 130 may be located on top of the wind turbine 100 (e.g., attached to the top of the nacelle 115) with cameras pointed generally upward to provide visual coverage directly above the wind turbine 100. Optical imaging sensor module 130 may be identical to optical imaging sensor modules 125. Alternatively, optical imaging sensor module 130 may differ from modules 125, for example, the optical imagine sensor module 130 may include additional WFOV cameras. Any other suitable arrangement of optical imaging sensor modules 125, 130 may also be used.

Additional automated systems and methods may employ optical imaging technology similarly as described above to conduct bird and/or bat population surveys prior to or after construction of a wind turbine or wind turbine farm. Such automated surveys may determine, for example, the populations or observations of the presence and movements of particular protected species of birds and/or bats (e.g., Bald Eagles and/or Golden Eagles) in an area in which a wind farm is to be constructed or has already been constructed. A decision as to whether or not to construct a wind farm may be based or partially based on the results of such an automated survey. Similarly, a decision as to whether or not to install a risk mitigation system at a proposed or an existing wind farm, such as those described above for example, may be based or partially based on such an automated survey. Such systems and methods may be employed for onshore and/or offshore wind sites.

Such an automated bird and/or bat surveying system may include, for example, one or more WFOV cameras as described above, and two or more tracking high-resolution cameras arranged as described above to track birds or bats in the field of view of the one or more WFOV cameras. For example, the system may include one or more optical sensor modules 125 as described above. The system may also comprise a controller, for example similar to controller 123 described above, in communication with the cameras. The controller may implement an algorithm in which it receives from the WFOV camera or cameras images in which it detects a bird or bat. The controller may then control the one or more high-resolution tracking (e.g., pan/tilt) cameras to track the bird or bat and collect and analyze high resolution images from which the controller determines whether or not the bird or bat is of a particular species of interest (e.g., a protected species for which risk is to be mitigated). The controller may make that determination based, for example, on color, shape, size (e.g., wing span), flight characteristics (e.g., speed, wing motion and/or wing beat frequency), and/or any other suitable features of the bird or bat. For example, the controller may determine whether or not a detected bird is a Golden Eagle or a Bald Eagle. If the detected bird or bat is a member of the species of interest, the controller may for example record images of and information about the detected bird or bat on a hard drive or in other memory medium, or transmit such images and/or information to another device for storage. The controller may for example count the number of instances in which birds or bats of the particular species of interest are detected.

This disclosure is illustrative and not limiting. Further modifications will be apparent to one skilled in the art in light of this disclosure and are intended to fall within the scope of the appended claims.

We claim:

1. An automated system for mitigating risk to an airborne animal from a wind turbine, the automated system comprising:
a plurality of optical imaging sensors having a combined field of view to image all approachable directions around the wind turbine corresponding to a substantially hemispherical mitigation volume surrounding the wind turbine; and
a controller configured to automatically:
receive and analyze images from the optical imaging sensors;
send a first signal to curtail operation of the wind turbine to a predetermined risk mitigating level after the controller determines from images received from the optical imaging sensors that the airborne animal is a member of a predetermined species and is within the substantially hemispherical mitigation volume; and
subsequently send a second signal to resume normal operation of the wind turbine after the controller determines from additional images from the optical imaging sensors that the airborne animal has exited the substantially hemispherical mitigation volume.

2. The automated system of claim 1, wherein the substantially hemispherical mitigation volume has a boundary defined by a distance (R) from the wind turbine, wherein the distance (R) is a distance that the predetermined species flies at a characteristic speed of that species in a time required to curtail operation of the wind turbine and wherein the controller is configured to determine whether the airborne animal is a member of the predetermined species before the airborne animal is closer to the wind turbine than the distance (R).

3. The automated system of claim 2, wherein the distance (R) is measured from at or near the base of the wind turbine.

4. The automated system of claim 2, wherein the distance (R) is measured from at or near the location of one or more optical imaging sensors.

5. The automated system of claim 2, wherein the distance (R) is measured from at or near the wind turbine nacelle.

6. The automated system of claim 2, wherein the characteristic speed of the predetermined species is an average horizontal flight speed or a maximum horizontal flight of the predetermined species.

7. The automated system of claim 1 wherein at least one of the optical imaging sensors is attached to a wind turbine tower supporting the wind turbine blades.

8. The automated system of claim 1, wherein the plurality of optical imaging sensors are arranged with overlapping fields of view.

9. The automated system of claim 1, wherein the plurality of optical imaging sensors comprise a plurality of wide field of view cameras arranged with overlapping fields of view and with the combined field of view that visually occupies 360 degrees around the wind turbine.

10. The automated system of claim 1, wherein at least one of the plurality of optical imaging sensors is arranged with a field of view directly above the wind turbine.

11. The automated system of claim 1, wherein the optical imaging sensors comprise a plurality of wide angle field of view cameras each having a fixed field of view for object detection and two or more high-resolution tracking cameras for stereoscopic imaging from overlapping fields of view to track the airborne animal flying in a field of view of the one or more wide angle field of view cameras.

12. An automated system for mitigating risk from a wind turbine, the automated system comprising:
a plurality optical imaging sensors;
a deterrent system;
a controller configured to automatically:
receive and analyze images from the optical imaging sensors; and
send a signal to the deterrent system to deploy a deterrent after the controller determines from images from the optical imaging sensors that an airborne animal is a member of a predetermined species and is within a mitigation volume around the wind turbine where a boundary of the mitigation volume is defined by a distance (R) from the wind turbine, and where the distance (R) is a distance that the predetermined species flies at a characteristic speed of that species in a time required to curtail operation of the wind turbine;
wherein the controller is further configured to determine whether the airborne animal is a member of the one or more predetermined species before the airborne animal is closer to the wind turbine than the distance (R).

13. The automated system of claim 12, wherein the distance (R) is measured from at or near the deterrent system.

14. The automated system of claim 12, wherein the controller is further configured to continuously deploy the deterrent after the controller determines from images from the optical imaging sensors that the airborne animal has not exited the mitigation volume.

15. An automated system for surveying the population of one or more predetermined species of interest comprising:
a plurality of optical imaging sensors connected to a tower and having a combined field of view to image all approachable directions around the tower;
a controller that receives and analyzes images from the optical imaging sensors and determines whether an airborne object detected with the optical imaging sensors is a member of the one or more predetermined species of interest for the airborne animal that is within a substantially hemispherical detection volume around the tower, wherein a boundary of the detection volume is defined by a distance (R) that is at least 600 m.

16. The automated system of claim 15, wherein at least one of the optical imaging sensors is attached to a tower that supports wind turbine blades.

17. The automated system of claim 15, wherein the optical imaging sensors comprise one or more wide angle field of view cameras for object detection and two or more high-resolution tracking cameras for stereoscopic imaging from overlapping fields of view to track the airborne object and determine whether the airborne object is an airborne animal flying in a field of view of the one or more wide angle field of view cameras.

18. A method of surveying a bird and/or a bat population, the method comprising the steps of:
providing the automated system of claim 15;
imaging the detection volume for a time period with the plurality of optical imaging sensors to determine a total number of the predetermined species of interest within the detection volume;
thereby surveying bird and/or bat population within the detection volume.

19. The method of claim 18, further comprising the step of:
positioning the automated system to provide the detection volume that corresponds to a potential location of a wind turbine or a wind turbine farm;
determining whether to install the wind turbine or the wind turbine farm based on the bird and/or bat population.

20. The method of claim 18, further comprising the step of:
deciding whether or not to install a risk mitigation system at a proposed or an existing wind turbine or wind turbine farm based at least partially on the surveyed bird and/or bat population.

* * * * *